(12) United States Patent
Getschmann

(10) Patent No.: US 6,265,802 B1
(45) Date of Patent: Jul. 24, 2001

(54) LAMINATED ROTOR ASSEMBLY AND METHOD FOR A DYNAMOELECTRIC MACHINE

(75) Inventor: Horst Getschmann, Harwinton, CT (US)

(73) Assignee: Warner Electric Technology, Inc., Richmond, VA (US)

( * ) Notice: Subject to any disclaimer, the term of this patent is extended or adjusted under 35 U.S.C. 154(b) by 664 days.

(21) Appl. No.: 08/631,952

(22) Filed: Apr. 15, 1996

(51) Int. Cl.⁷ .................................................. H02K 1/28
(52) U.S. Cl. ............................ 310/216; 310/216; 310/156
(58) Field of Search ........................ 29/598; 310/49 R, 310/216, 217, 261, 259, 269, 156

(56) References Cited

U.S. PATENT DOCUMENTS

| | | | |
|---|---|---|---|
| 3,234,419 | * 2/1966 | Picozzi | 310/211 |
| 3,659,129 | * 4/1972 | Pettersen | 310/216 |
| 4,423,343 | * 12/1983 | Field, II | 310/49 R |
| 4,423,345 | * 12/1983 | Nilsson | 310/153 |
| 4,585,967 | 4/1986 | Mayer et al. | 310/217 |
| 4,695,754 | 9/1987 | Popov et al. | 310/156 |
| 4,728,842 | 3/1988 | Martin | 310/217 |
| 4,792,713 | 12/1988 | Bush | 310/217 |
| 4,809,429 | 3/1989 | Martin | 310/217 |
| 4,987,330 | 1/1991 | Murphy et al. | 310/217 |
| 5,005,281 | 4/1991 | Burns | 29/596 |
| 5,140,211 | 8/1992 | Ucida | 310/156 |
| 5,142,178 | 8/1992 | Kloster et al. | 310/217 |
| 5,170,086 | * 12/1992 | Wrobel et al. | 310/217 |
| 5,218,252 | * 6/1993 | Iseman et al. | 310/64 |
| 5,349,741 | * 9/1994 | Neuenschwander | 29/598 |

FOREIGN PATENT DOCUMENTS

| | | | |
|---|---|---|---|
| 535706 | * 7/1993 | (EP) | 310/217 |
| 2247004 | * 6/1975 | (FR) | 310/217 |

* cited by examiner

Primary Examiner—Karl Tamai
(74) Attorney, Agent, or Firm—Dykema Gossett PLLC

(57) ABSTRACT

A rotor assembly and method for a dynamoelectric machine includes a shaft having an outer circumferential surface defining a shaft diameter. The rotor assembly also includes a plurality of laminations, wherein each lamination has a central opening defining an inner periphery. The inner periphery includes a plurality of radially inwardly extending compressible protrusions defining an inner diameter slightly smaller than the shaft diameter. The protrusions are compressed as a lamination is mounted onto the shaft to form a press fit between the lamination and the shaft.

16 Claims, 2 Drawing Sheets

LAMINATED ROTOR ASSEMBLY AND METHOD FOR A DYNAMOELECTRIC MACHINE

BACKGROUND OF THE INVENTION

This invention relates in general to dynamoelectric machines, and more particularly to a laminated rotor assembly and method for a dynamoelectric machine.

A dynamoelectric machine is a rotating electric machine capable of converting electric energy into mechanical energy (a motor) or converting mechanical energy into electric energy (a generator). A dynamoelectric machine includes a rotor housed within a stator. It is well known to form a rotor assembly by stacking many thin laminations of magnetic steel on a central shaft, axially compressing the stack and fixing the stack on the shaft. The laminations can be held together by bonding, welding, cleating or the like. Adhesives including an epoxy resin are commonly used to bond the laminations.

A specified orientation of each lamination is required to properly define the rotor poles and winding slots. Such orientation is commonly achieved by forming a key on the outer circumference of the shaft. A complementary keyway is formed on each lamination so that the laminations are properly aligned. In other prior art machines, splines are formed on the shaft and the laminations to align the stack on the shaft. Failure to properly align the laminations may cause rotor imbalance and difficulties in winding insertion. While laminations have been aligned in prior art devices, forming keys or splines in the outer circumference of the shaft is costly and is known to cause distortion in the shaft.

The art continues to seek improvements. It is desirable to economically secure rotor laminations to a shaft without causing distortion of the shaft. Furthermore, it is desirable to efficiently mount and align rotor laminations on a rotor shaft.

SUMMARY OF THE INVENTION

The present invention includes a laminated rotor assembly for a dynamoelectric machine such as an electric motor. Rotor laminations are secured to the rotor shaft as radially inwardly extending protrusions are compressed. The rotor laminations are secured without use of costly keys and keyways or splines. Since a rotor shaft is not keyed or splined, rotor shaft distortion is eliminated.

In a preferred embodiment, a rotor assembly and method for a dynamoelectric machine includes a shaft having an outer circumferential surface defining a shaft diameter. The rotor assembly also includes a plurality of laminations, wherein each lamination has a central opening defining an inner periphery. The inner periphery includes a plurality of radially inwardly extending compressible protrusions defining an inner diameter slightly smaller than the shaft diameter. The protrusions are compressed as a lamination is mounted onto the shaft to form a press fit between the lamination and the shaft.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
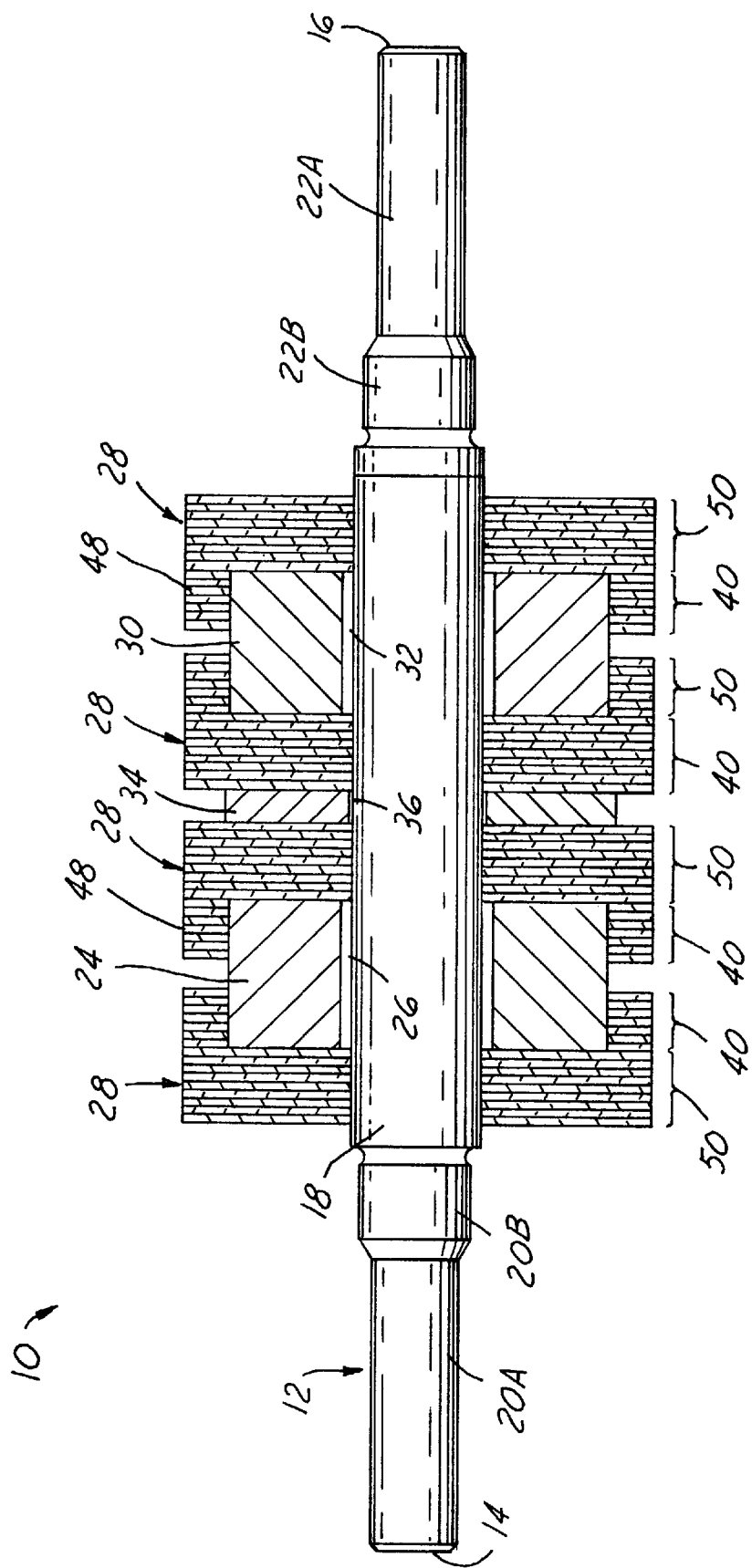
FIG. 1 is a side view, partly in section, of a rotor assembly in accordance with the present invention.

A rotor assembly, indicated generally at 10, for a dynamoelectric machine is illustrated in FIG. 1. The rotor assembly 10 includes a shaft, indicated generally at 12, having a first end 14 and a second end 16. A central portion 18 of the shaft 12 between the ends 14 and 16 is preferably formed with a smooth outer surface defining a shaft diameter. In the embodiment illustrated in FIG. 1, the diameter of the central portion 18 is substantially constant. In other embodiments, the central portion 18 can be tapered. If desired, stepped portions 20A and 20B of the shaft 12 can be provided between the central portion 18 and the first end 14. Similarly, if desired, stepped portions 22A and 22B of the shaft 12 can be provided between the central portion 18 and the second end 16.

A first annular magnet 24 having a central opening 26 is axially mounted on the central portion 18 of the shaft 12. First and second pole pieces, indicated generally at 28, are axially mounted on opposite sides of the magnet 24 as described below to retain the magnet 24 on the shaft 12. A second annular magnet 30 having a central opening 32 is axially mounted on the central portion of the shaft 12. Third and fourth pole pieces 28 are axially mounted on opposite sides of the magnet 30 as described below to retain the magnet 30 on the shaft 12. A spacer 34 having a central opening 36 is axially mounted on the central portion 18 of the shaft 12 between the second and third pole pieces 28. In this manner, the rotor assembly 10 has been configured as a four pole rotor assembly for use in a dynamoelectric machine. In other embodiments, a rotor assembly can have only one magnet contained by a pair of pole pieces, or more than two magnets, wherein each magnet is retained by respective pole pieces and separated by appropriate spacers.

Each pole piece 28 is formed from a plurality of laminations aligned with each other and preferably bonded together in a known manner. An adhesive (not illustrated) such as an epoxy resin can be used to bond the laminations. Preferably, each lamination is formed as a thin stamping or punching of magnetic steel. In the embodiment illustrated, each pole piece 28 includes ring laminations 40 and mounting laminations 50. As described below, the laminations 40 and 50 are aligned and stacked together to form a pole piece 28.

Figure 2:
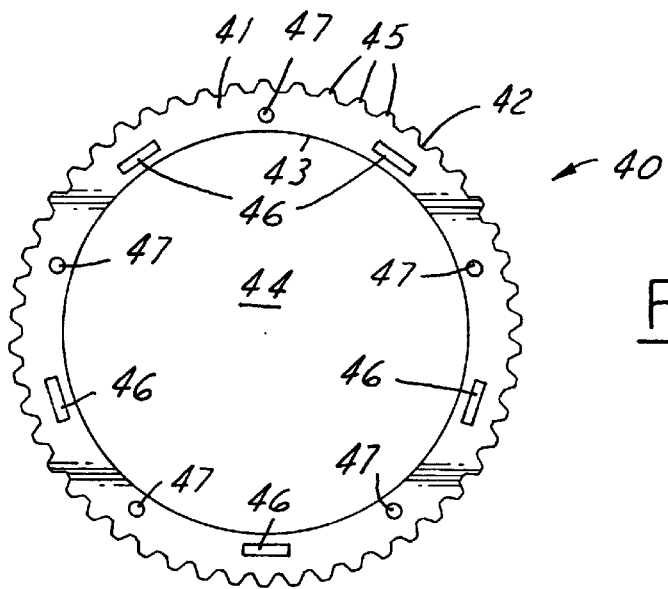
FIG. 2 is an end view of one ring lamination of the rotor assembly of FIG. 1 prior to assembly.

As illustrated in FIG. 2, each ring lamination 40 has a generally circular body 41 having an outer circumference 42 and an inner periphery 43 defining a central opening 44. Preferably, the inner periphery 43 is formed along a constant radius. Rotor teeth 45 are formed along the outer circumference 42 and aligned with rotor teeth on adjacent laminations when the pole piece 28 is assembled. The diameter of the central opening 44 is significantly larger than the diameter of the central portion 18 of the shaft 12. A plurality of known stacking grooves are formed in the body 41. In the embodiment illustrated, five rectangular stacking grooves 46 are equally spaced about the body 41 radially inwardly from the rotor teeth 45 to facilitate the alignment of laminations in a known manner. Five circular stacking grooves 47 are equally spaced between the rectangular grooves 46 and from each other to facilitate alignment of laminations.

Figure 3:
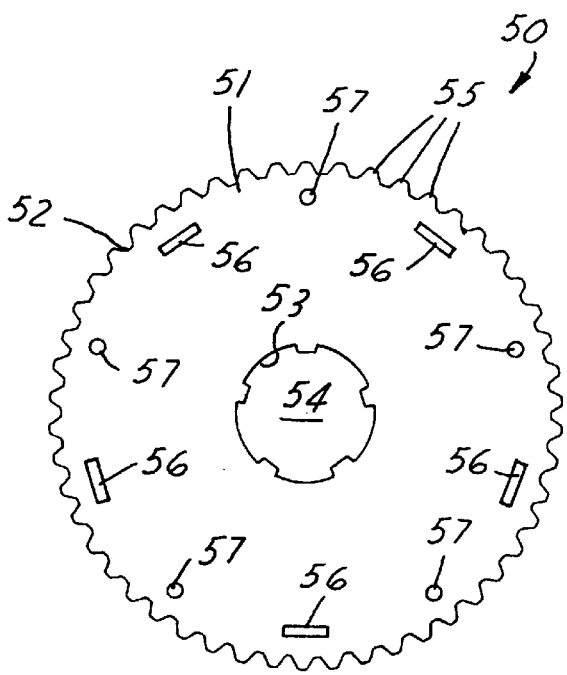
FIG. 3 is an end view of one mounting lamination of the rotor assembly of FIG. 1 prior to assembly.

As illustrated in FIG. 3, each mounting lamination 50 has a generally circular body 51 having an outer circumference 52 and an inner periphery 53 defining a central opening 54. Rotor teeth 55 are formed along the outer circumference 52 and aligned with rotor teeth on adjacent laminations when the pole piece 28 is assembled. The diameter of the central opening 54 is slightly larger than the diameter of the central portion 18 of the shaft 12. A plurality of known stacking grooves are formed in the body 51. In the embodiment illustrated, five rectangular stacking grooves 56 are equally spaced about the body 51 radially inwardly from the rotor teeth 55 to facilitate the alignment of laminations in a known manner. Five circular stacking grooves 57 are equally spaced between the rectangular grooves 56 and from each other to facilitate alignment of laminations.

Figure 4:
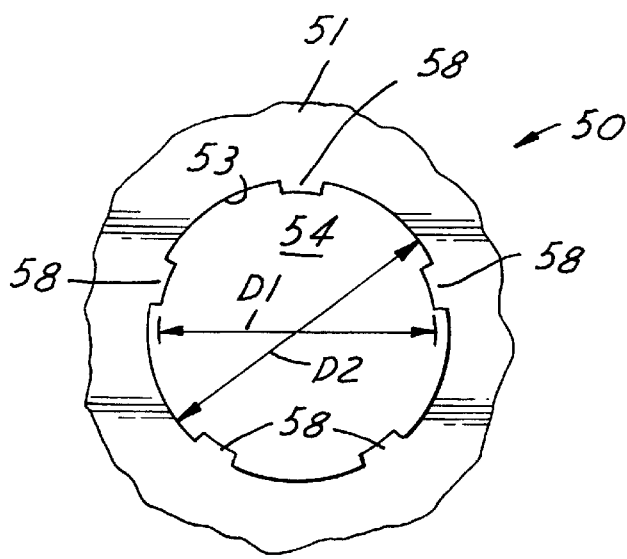
FIG. 4 is an enlarged portion of the mounting lamination of FIG. 3 illustrating an inner periphery of a central opening having radially inwardly extending protrusions.

As illustrated best in FIG. 4, the inner periphery 53 of a mounting lamination 50 is formed with an irregular boundary. A plurality of radially inwardly extending protrusions 58 are formed about the inner periphery 53 of a mounting lamination 50. In the embodiment illustrated, five protrusions 58 are equally spaced about the inner periphery 53. Each protrusion 58 is sized to span a predetermined distance of the inner periphery 53. An inner diameter D1 defined by the innermost edges of the protrusions 58 is sized to be slightly smaller than the diameter of the central portion 18 of the shaft 12. The inner diameter D1 is also smaller than an outer diameter D2 defined by portions of the inner periphery 53 not interrupted by the protrusions 58.

During assembly, laminations 40 and 50 are stacked together to form a pole piece 28. As illustrated in FIG. 1, a predetermined plurality of ring laminations 40 are stacked together and aligned via the stacking grooves 46 and 47. A predetermined plurality of mounting laminations 50 are stacked together and aligned via the stacking grooves 56 and 57. The ring laminations 40 and the mounting laminations 50 are aligned and bonded together to form a pole piece 28. The central openings 44 of the ring laminations 40 define cavities 48 to receive magnets 24 and 30, as illustrated in FIG. 1. In some embodiments, the magnets 24 and 30 can be bonded to pole pieces 28.

The central portion 18 of the shaft 12 is coated with a suitable adhesive (not illustrated) such as an epoxy resin. A pair of pole pieces 28 are placed on opposite sides of a magnet and axially mounted on the shaft 12 by inserting the shaft 12 through openings 44 and 54. As the protrusions 58 of the mounting laminations 50 encounter the outer circumference of the central portion 18 of the shaft 12, the protrusions 58 are compressed to provide an interference or press fit between the laminations 50 and the shaft 12. In this manner, the laminations 50 are pressed onto the central portion 18 of the shaft 12. The protrusions 58 act as means to fix the laminations 50 in a particular orientation with respect to the shaft 18. The combination of the press fit created by the protrusions 58 and the adhesive force from the adhesive secure the laminations 50 to the shaft 12 without the use of splines or keys.

Ring laminations 40 are bonded to the mounting laminations 50 and thus secured to the shaft 12 by the compressed protrusions 58 and adhesive. Each magnet 24 and 30 is contained by a pair of secured pole pieces 28 and thus is securely mounted on the shaft 12. The spacer 34 is trapped between secured pole pieces 28, thereby securely mounting the spacer 34 on the shaft 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A rotor assembly for a dynamoelectric machine comprising:
   a shaft including an outer circumferential surface portion having a circular cross section defining a shaft diameter; and
   a plurality of laminations, each lamination having a central opening receiving said shaft, said central opening defining an inner periphery including a plurality of radially inwardly extending compressible protrusions defining an inner diameter slightly smaller than said shaft diameter, said protrusions being compressed onto said outer circumferential surface portion of said shaft to form a press fit between said lamination and said shaft.

2. The rotor assembly defined in claim 1 wherein said inner periphery of each lamination not interrupted by said protrusions defines an outer diameter larger than said shaft diameter.

3. The rotor assembly defined in claim 1 where five protrusions are formed and equally spaced along said inner periphery of each lamination.

4. The rotor assembly defined in claim 1 wherein said laminations include rotor teeth formed along an outer circumference.

5. The rotor assembly defined in claim 1 wherein said laminations include stacking grooves.

6. The rotor assembly defined in claim 1 wherein said shaft outer circumferential surface is smooth.

7. A rotor assembly for a dynamoelectric machine comprising:
   a shaft including an outer circumferential surface portion having a circular cross section defining a shaft diameter;
   a plurality of ring laminations, each ring lamination having a central opening receiving said shaft; and
   a plurality of mounting laminations, each mounting lamination having a central opening receiving said shaft, said central opening defining an inner periphery including a plurality of radially inwardly extending compressible protrusions defining an inner diameter slightly smaller than said shaft diameter, said protrusions bieng compressed onto said outer circumferential surface portion of said shaft to form a press fit between said mounting lamination and said shaft.

8. The rotor assembly defined in claim 7 wherein said mounting laminations are aligned and bonded together.

9. The rotor assembly defined in claim 8 wherein said ring laminations are aligned with and bonded to said mounting laminations.

10. The rotor assembly defined in claim 9 wherein said ring laminations include rotor teeth formed along an outer circumference and aligned with rotor teeth of adjacent ring laminations.

11. The rotor assembly defined in claim 10 wherein said mounting laminations include rotor teeth formed along an outer circumference and aligned with said rotor teeth of said ring laminations.

12. The rotor assembly defined in claim 11 wherein said ring and mounting laminations include complementary stacking grooves.

13. The rotor assembly defined in claim 12 wherein said shaft outer circumferential surface is smooth.

14. A method of assembling a rotor assembly for a dynamoelectric machine comprising the steps of:
   forming a shaft including an outer circumference portion having a circular cross section defining a shaft diameter;

forming a plurality of laminations, each lamination having a central opening defining an inner periphery, the inner periphery including a plurality of radially inwardly extending compressible protrusions defining a diameter slightly smaller than said shaft diameter;

inserting said shaft into said central openings of said laminations; and compressing said protrusions against said outer circumferential surface portion of said shaft to form a press fit between said laminations and said shaft.

15. The method of assembling a rotor assembly defined in claim 14 including the steps of:

forming a plurality of ring laminations, each ring lamination including a central opening; inserting said shaft into said central openings of said ring laminations;

aligning said ring laminations with said mounting laminations; and bonding said ring laminations to said mounting laminations.

16. The method of assembling a rotor assembly defined in claim 14 wherein before the step of inserting said shaft into said central openings of said mounting laminations, the method includes the step of coating the outer circumference of said shaft with an adhesive.

\* \* \* \* \*

UNITED STATES PATENT AND TRADEMARK OFFICE
CERTIFICATE OF CORRECTION

PATENT NO.   : 6,265,802 B1
DATED         : July 24, 2001
INVENTOR(S)  : Getschmann It is certified that error appears in the above-identified patent and that said Letters Patent is hereby corrected as shown below:

<u>Column 4,</u>
Line 41, delete "bieng" and insert -- being --.

<u>Column 5,</u>
Line 14, after "opening;" begin a new paragraph.

Signed and Sealed this

Twentieth Day of August, 2002

*Attest:*

*Attesting Officer*

JAMES E. ROGAN
*Director of the United States Patent and Trademark Office*